US011899381B2

(12) United States Patent
Sakai

(10) Patent No.: US 11,899,381 B2
(45) Date of Patent: Feb. 13, 2024

(54) IMAGE FORMING APPARATUS

(71) Applicant: FUJIFILM Business Innovation Corp., Tokyo (JP)

(72) Inventor: Yusuke Sakai, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 18/084,548

(22) Filed: Dec. 20, 2022

(65) Prior Publication Data

US 2023/0236527 A1 Jul. 27, 2023

(30) Foreign Application Priority Data

Jan. 24, 2022 (JP) ................................ 2022-008946

(51) Int. Cl.

| | |
|---|---|
| ***G03G 15/04*** | (2006.01) |
| ***G03G 15/08*** | (2006.01) |
| ***G03G 21/16*** | (2006.01) |

(52) U.S. Cl.

CPC ....... *G03G 15/0886* (2013.01); *G03G 21/169* (2013.01); *G03G 21/1676* (2013.01); *G03G 2215/066* (2013.01); *G03G 2221/0063* (2013.01)

(58) Field of Classification Search

CPC .. G03G 9/0834; G03G 9/0835; G03G 9/1132; G03G 15/0886; G03G 21/169

USPC ........................................ 399/107, 110, 119

See application file for complete search history.

(56) References Cited

U.S. PATENT DOCUMENTS

| | | | | |
|---|---|---|---|---|
| 6,646,267 | B1 | 11/2003 | Haider et al. | |
| 8,918,015 | B2 * | 12/2014 | Sakakibara ........ | G03G 21/1814 399/113 |
| 10,691,044 | B2 * | 6/2020 | Fujii .................. | G03G 15/0136 |

FOREIGN PATENT DOCUMENTS

| | | | |
|---|---|---|---|
| JP | 2007266008 | | 10/2007 |
| JP | 2009093099 | | 4/2009 |
| JP | 2017151178 | * | 8/2017 |

* cited by examiner

*Primary Examiner* — Hoan H Tran

(74) *Attorney, Agent, or Firm* — JCIPRNET

(57) ABSTRACT

An image forming apparatus includes a detachable unit that is attachable to and detachable from an apparatus main body; and a cleaning unit that is provided in the apparatus main body, and at the time of attachment or detachment of the detachable unit, comes into contact with a grip portion of the detachable unit to clean a floating substance adhered to the grip portion, the floating substance being in the apparatus main body.

5 Claims, 11 Drawing Sheets

IMAGE FORMING APPARATUS

CROSS-REFERENCE TO RELATED APPLICATIONS

This application is based on and claims priority under 35 USC 119 from Japanese Patent Application No. 2022-008946 filed Jan. 24, 2022.

BACKGROUND

Technical Field

The present invention relates to an image forming apparatus.

Related Art

Conventionally, as a technique related to an image forming apparatus, for example, a technique disclosed in JP2009-93099A or the like has already been proposed.

JP2009-93099A discloses an electrophotographic image forming apparatus configured to have a collecting unit that wraps and collects a detachable unit containing toner and/or carrier therein at the time of replacement thereof.

SUMMARY

Aspects of non-limiting embodiments of the present disclosure relate to an image forming apparatus that suppresses an operator's hand from being soiled by a floating substance such as cloud toner adhering to a grip portion of a detachable unit as compared with a case where there is no provision of a cleaning unit that comes into contact with and cleans the grip portion of the detachable unit when the detachable unit is attached or detached.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a detachable unit that is attachable to and detachable from an apparatus main body; and a cleaning unit that is provided in the apparatus main body, and at the time of attachment or detachment of the detachable unit, comes into contact with a grip portion of the detachable unit to clean a floating substance adhered to the grip portion, the floating substance being in the apparatus main body.

DETAILED DESCRIPTION

An embodiment of the present invention will now be described in the following with reference to the drawings.

First Embodiment

Figure 1:
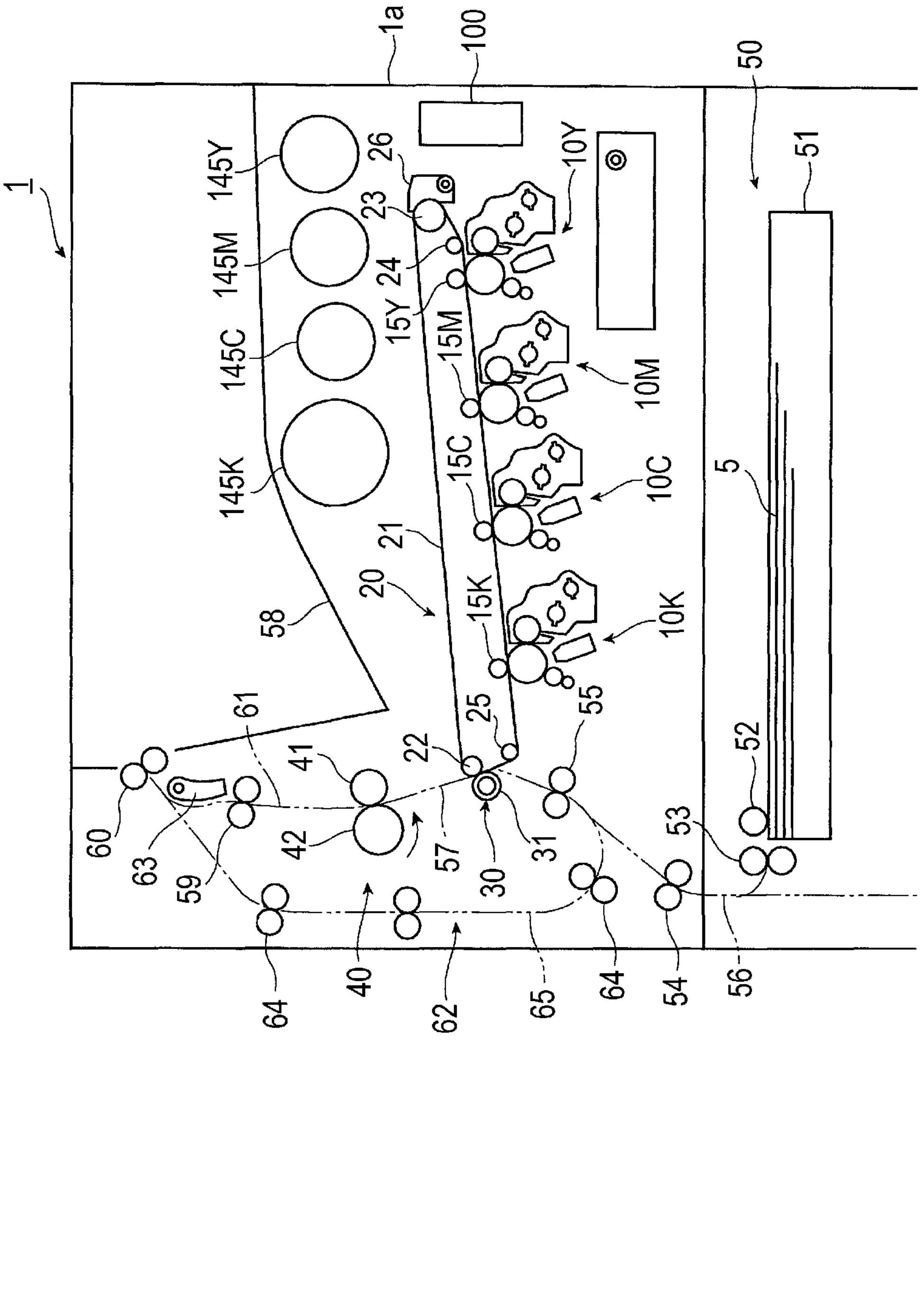
FIG. 1 is an overall structural view illustrating an image forming apparatus according to a first embodiment of the present invention.

FIG. 1 is a structural view illustrating an outline of an image forming apparatus according to a first embodiment of the present invention.

<Overall Configuration of Image Forming Apparatus>

An image forming apparatus 1 according to the first embodiment is configured as, for example, a color printer. As illustrated in FIG. 1, the image forming apparatus 1 includes a plurality of imaging devices 10 that form toner images to be developed with toners that constitute a developer, an intermediate transfer device 20 that holds the toner images formed by the imaging devices 10 and transports the toner images to a secondary transfer position where the toner images are ultimately secondarily transferred onto a recording sheet 5 as an example of a recording medium, a sheet feeding device 50 that stores and transports a required recording sheet 5 to be supplied to the secondary transfer position of the intermediate transfer device 20, a fixing device 40 that fixes the toner images secondarily transferred on the recording sheet 5 by the intermediate transfer device 20, and the like. 1*a* in the drawings indicates the apparatus main body of the image forming apparatus 1. The apparatus main body 1*a* includes a supporting structural member, an external cover, and the like. The two-dot chain line in the drawing indicates a main transport path along which the recording sheet 5 is transported in the apparatus main body 1*a*.

The imaging device 10 includes four imaging devices 10Y, 10M, 10C, and 10K that dedicatedly form four toner images, yellow (Y), magenta (M), cyan (C), and black (K), respectively. The four imaging devices 10 (Y, M, C, and K) are slantingly disposed in a line in an internal space of the apparatus main body 1*a* such that the imaging device 10Y for yellow (Y) is positioned upward along a vertical direction Z and the imaging device 10K for black (K) is positioned downward along the vertical direction Z.

The four imaging devices 10 include the four imaging devices 10 (Y, M, and C) for yellow (Y), magenta (M), and cyan (C) colors, respectively, and the imaging device 10K for black (K). The black imaging device 10K is disposed on the most downstream side in a movement direction B of an intermediate transfer belt 21 of the intermediate transfer device 20. The image forming apparatus 1 has, as image forming modes, a full-color mode in which the color imaging devices 10 (Y, M, and C) and the black (K) imaging device 10K are operated to form a full-color image, and a black and white mode in which only the black (K) imaging device 10K is operated to form a black and white (monochrome) image.

Figure 2:
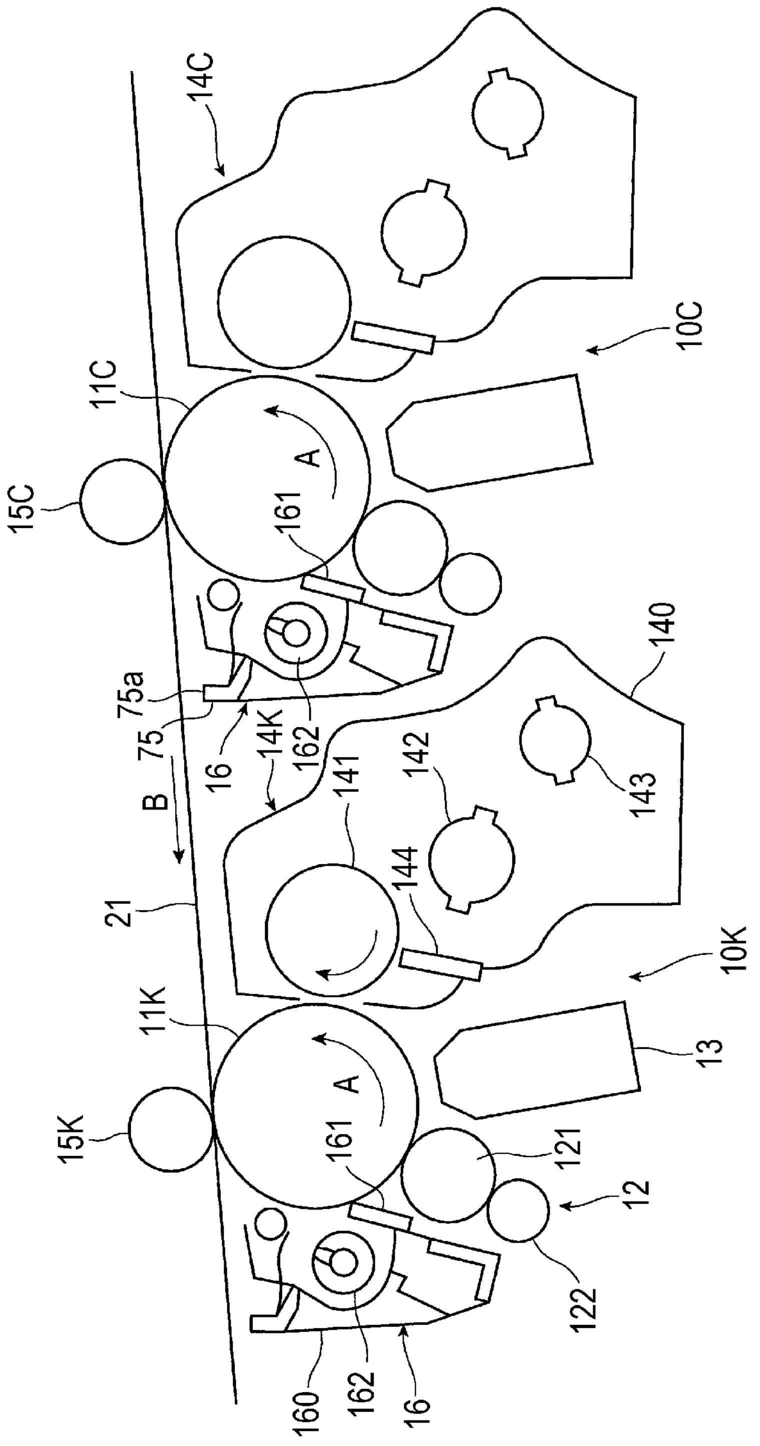
FIG. 2 is a structural view illustrating an imaging device of the image forming apparatus according to the first embodiment of the present invention.

As illustrated in FIG. 2, each of the imaging devices 10 (Y, M, C, and K) includes a photosensitive drum 11 that rotates as an example of an image forming unit (image carrier). There are provided around the photosensitive drum 11 a charging device 12 that charges a peripheral surface (image carrying surface) of the photosensitive drum 11 on which an image can be formed to a predetermined potential, an exposure device 13 that irradiates the charged peripheral surface of the photosensitive drum 11 with light based on image information (signal) of the image to form an electrostatic latent image having a potential difference (for each color), a developing device 14 (Y, M, C, or K) as an example of an image forming unit (developing unit) that develops the electrostatic latent image into a toner image with a toner of a developer for the corresponding color (Y, M, C, or K), a primary transfer device 15 (Y, M, C, or K) that transfers the toner image to the intermediate transfer device 20, a drum cleaning device 16 (Y, M, C, or K) that removes and cleans an adhered substance such as toner adhering to and remaining on the image carrying surface of the photosensitive drum 11 after the primary transfer, and the like.

The photosensitive drum 11 has the image carrying surface having a photoconductive layer (photosensitive layer) made of a photosensitive material and formed around a peripheral surface of a cylindrical or columnar base material to be grounded. The photosensitive drum 11 is supported so as to receive a driving force transmitted from a drive device (not shown) to rotate in a direction indicated by an arrow A.

The charging device 12 is configured with a contact-type charging roller 121 that is disposed in contact with the photosensitive drum 11. The charging roller 121 has a cleaning roller 122 that cleans a surface of the charging roller 121 disposed at a back surface thereof so as to be in contact with each other. A charging voltage is supplied to the charging device 12. In a case where the developing device 14 is configured to perform reversal development, a voltage or a current with the same polarity as a charge polarity of a toner supplied from the developing device 14 is supplied as a charging voltage. The charging roller 121 and the cleaning roller 122 are driven and rotated by a driving force transmitted from the photosensitive drum 11.

The exposure device 13 is configured with a light-emitting diode (LED) print head that irradiates the photosensitive drum 11 with light according to image information by LED as a plurality of light-emitting elements arranged in an axial direction of the photosensitive drum 11 and forms electrostatic latent images on the photosensitive drum. Alternatively, the exposure device 13 may perform deflection scanning of a laser light beam configured according to the image information along the axial direction of the photosensitive drum 11.

Each of the developing devices 14 (Y, M, C, and K) includes a casing 140 having an opening and a developer containing chamber formed therein, in which there are disposed a developing roller 141 that holds the developer and transports the developer to a developing area opposed to the photosensitive drum 11, a stir supply member 142 such as a screw auger that supplies the developer so as to pass through the developing roller 141 while stirring the developer, a stir transport member 143 such as a screw auger that transports the developer to the stir supply member 142 while stirring the developer, and a layer thickness regulating member 144 that regulates an amount (layer thickness) of the developer held by the developing roller 141. A developing voltage from a power source device (not shown) is supplied between the developing roller 141 in the developing device 14 and the photosensitive drum 11. Furthermore, the developing roller 141 receives the driving force transmitted from the drive device (not shown) to rotate in a predetermined direction. The stir supply member 142 and the stir transport member 143 are driven and rotated by a driving force transmitted from the developing roller 141. Furthermore, as the developer for four colors, a two-component developer containing a nonmagnetic toner and a magnetic carrier is used.

Each primary transfer device 15 (Y, M, C, or K) is a contact-type transfer device including a primary transfer roller that comes into contact with the periphery of the photosensitive drum 11 via the intermediate transfer belt 21 and rotates and that is supplied with a primary transfer voltage. A DC voltage indicating a polarity opposite to the charge polarity of the toner is supplied from the power source device (not shown) as the primary transfer voltage.

The drum cleaning device 16 includes a container-shaped main body 160 that is partly opened, a cleaning plate 161 that is disposed so as to come into contact with the peripheral surface of the photosensitive drum 11 after the primary transfer at a predetermined pressure and removes and cleans an adhered substance such as residual toner, a sending-out member 162 such as a screw auger that collects the adhered substance such as toner removed by the cleaning plate 161 and transports the adhered substance so as to be sent out to a collecting system (not shown), and the like. A plate-shaped member (e.g., blade) made of a material such as rubber is used as the cleaning plate 161. The sending-out member 162 of the drum cleaning device 16 is driven and rotated by the driving force transmitted from the photosensitive drum 11.

As shown in FIG. 1, the intermediate transfer device 20 is disposed so as to be present at a position above the imaging devices 10 (Y, M, C, and K) along the Z direction. As illustrated in FIG. 2, the intermediate transfer device 20 mainly includes the intermediate transfer belt 21 that rotates in a direction indicated by an arrow B while passing through a primary transfer position between the photosensitive drum 11 and the primary transfer device 15 (primary transfer roller), a plurality of belt support rollers 22 to 25 that rotatably supports the intermediate transfer belt 21 while holding the intermediate transfer belt 21 from an inner surface thereof in a desired state, a secondary transfer device 30 as an example of a secondary transfer unit that is disposed on an outer peripheral surface (image carrying surface) side of the intermediate transfer belt 21 supported by the belt support roller 22 and secondarily transfers a toner image on the intermediate transfer belt 21 to the recording sheet 5, and a belt cleaning device 26 that removes and cleans an adhered substance such as toner and paper dust remaining on and adhering to the outer peripheral surface of the intermediate transfer belt 21 after passing through the secondary transfer device 30.

As the intermediate transfer belt 21, an endless belt made of, for example, a material obtained by dispersing a resistance regulator such as carbon black in a synthetic resin such as a polyimide resin, a polyamide resin or the like is used. Further, the belt support roller 23 is configured to be a driving roller that is rotationally driven by the drive device (not shown) and that also serves as a counter roller of the belt cleaning device 26, the belt support roller 24 is configured to be a leveling roller that forms an image formation surface of the intermediate transfer belt 21, the belt support roller 25 is configured to be a tension applying roller that applies a tension to the intermediate transfer belt 21, and the belt support roller 22 is configured to be a counter roller opposed to the secondary transfer device 30.

The intermediate transfer device 20 is configured such that the belt support roller 24 is movable toward the inside and outside of the intermediate transfer belt 21 together with the primary transfer device 15 (Y, M, C, or K). In the full-color mode, as illustrated in FIG. 1, the belt support roller 24 is disposed at a position at which the primary transfer devices 15 (Y, M, C, and K) come into contact with surfaces of the photosensitive drums 11 (Y, M, C, and K) via the intermediate transfer belt 21. On the other hand, in the black and white mode, only the primary transfer device 15K for black (K) comes into contact with a surface of the photosensitive drum 11K for black (K) via the intermediate transfer belt 21, and the belt support roller 24 moves to a position where the primary transfer devices 15 (Y, M, and C) for colors are separated from the surfaces of the photosensitive drums 11 (Y, M, and C) as well as from the intermediate transfer belt 21.

Further, at the time of maintenance, the belt support roller 24 moves to a position where the primary transfer devices 15 (Y, M, and C) for color and the primary transfer device 15K for black (K) are separated from the surfaces of the photosensitive drums 11 as well as from the intermediate transfer belt 21.

As shown in FIG. 1, the secondary transfer device 30 is a contact-type transfer device including a secondary transfer roller 31 that comes into contact with a peripheral surface of the intermediate transfer belt 21 and rotates at the secondary transfer position, which is a portion of the outer peripheral surface of the intermediate transfer belt 21 supported by the belt support roller 22 in the intermediate transfer device 20 and that is supplied with a secondary transfer voltage. In addition, to the secondary transfer roller 31 or the belt support roller 22 of the intermediate transfer device 20, a DC voltage having a polarity opposite to or the same polarity as the charge polarity of the toner is supplied as the secondary transfer voltage from the power source device (not shown).

The fixing device 40 is configured by disposing, inside a casing (not shown) having an inlet and an outlet for the recording sheet 5, a roller-shaped or belt-shaped heating rotation body 41 that rotates in a direction indicated by an arrow and is heated by a heating unit so that a surface temperature is maintained at a predetermined temperature, a belt-shaped or roller-shaped pressurizing rotation body 42 that comes into contact with the heating rotation body 41 at a predetermined pressing force substantially along an axial direction of the heating rotation body 41 and is driven to rotate, and the like. In the fixing device 40, a contact portion where the heating rotation body 41 and the pressurizing rotation body 42 are in contact with each other serves as a fixing processing part that performs required fixing processing (heating and pressurizing).

The sheet feeding device 50 is disposed to be present at a position below the imaging devices 10 (Y, M, C, and K). The sheet feeding device 50 mainly includes a single sheet container (or a plurality of sheet containers) 51 that stores recording sheets 5 of a desired size, type, and the like in a stacked state, and feeding devices 52 and 53 that send out the recording sheets 5 one by one from the sheet container 51. For example, the sheet container 51 is attached so as to be able to be pulled out to the front side of the apparatus main body 1*a* (the side facing the user at the time of operation).

Examples of the recording sheet 5 include thin paper such as plain paper, tracing paper, and the like used in an electrophotographic copying machine, a printer, etc., an overhead projector (OHP) sheet, and the like. In order to further improve smoothness of a surface of an image after fixing, it is preferable that the surface of the recording sheet 5 is also as smooth as possible. For example, a so-called thick paper having a relatively large basis weight such as coated paper in which a surface of plain paper is coated with a resin or the like, or art paper for printing can be also suitably used.

Between the sheet feeding device 50 and the secondary transfer device 30, there is provided a sheet feeding transport path 56 including a single or a plurality of pairs of sheet transport rollers 54 and 55 for transporting the recording sheet 5 sent out from the sheet feeding device 50 to the secondary transfer position, and a transport guide (not shown). The pair of sheet transport rollers 55 disposed, on the sheet feeding transport path 56, at a position immediately before the secondary transfer position is configured as, for example, a roller (resist roller) that adjusts transport timing of the recording sheet 5. Between the secondary transfer device 30 and the fixing device 40, there is provided a sheet transport path 57 for transporting the recording sheet 5 after the secondary transfer sent out from the secondary transfer device 30 up to the fixing device 40. Furthermore, in a portion close to the outlet for sheets formed in the apparatus main body 1*a* of the image forming apparatus 1, there is provided a discharge transport path 61 including a pair of sheet discharge rollers 59 and 60 for discharging the recording sheet 5 after fixing sent out from the fixing device 40 to a sheet discharge portion 58 in an upper portion of the apparatus main body 1*a*.

The image forming apparatus 1 further includes a double-side unit 62 for forming images on both sides of the recording sheet 5. The double-side unit 62 introduces the recording sheet 5 through a switching gate 63 by rotating the pair of sheet discharge rollers 60 in the reverse direction while the pair of sheet discharge rollers 60 holds a rear end of the recording sheet 5 when the pair of sheet discharge rollers 59 transports the recording sheet 5 having an image formed on one side thereof to the sheet discharge portion 58. The double-side unit 62 has a double-side transport path 65 configured with a plurality of transport rollers 64 that transports the introduced recording sheet 5 in a state where the front and back sides of the sheet are reversed, and a transport guide (not shown).

Note that in FIG. 1, a reference numeral 145 (Y, M, C, and K) denotes a toner cartridge as an example of a developer storage container that stores a developer including at least a toner to be supplied to the corresponding developing device 14. In this embodiment, only the toner is stored in a toner cartridge 145 (Y, M, C, or K).

A reference numeral 100 in FIG. 1 denotes a control device that integrally controls operation of the image forming apparatus 1. The control device 100 includes a central processing unit (CPU), a read only memory (ROM), a random access memory (RAM), a bus connecting these CPU, ROM, etc. to each other, a communication interface, and the like.

<Operation of Image Forming Apparatus>

In the following, basic image forming operation by the image forming apparatus 1 will be described.

Described herein is operation in the full-color mode of forming a full-color image formed by combining toner images of four colors (Y, M, C, and K) using the above-described four imaging devices 10 (Y, M, C, and K).

When the image forming apparatus 1 receives image information and command information of a request for full-color image forming operation (printing) from a personal computer, an image reading device, or the like (not shown), the control device 100 starts the four imaging devices 10 (Y, M, C, and K), the intermediate transfer device 20, the secondary transfer device 30, the fixing device 40, and the like.

Then, in each of the imaging devices 10 (Y, M, C, and K), as illustrated in FIGS. 1 and 2, first, each of the photosensitive drums 11 rotates in the direction indicated by the arrow A, and each of the charging devices 12 charges the surface of each of the photosensitive drums 11 to required polarity (negative polarity in the first embodiment) and potential. Subsequently, the exposure device 13 irradiates the charged surface of the photosensitive drum 11 with light emitted on the basis of a signal of an image obtained by conversion into each color component (Y, M, C, or K), thereby forming an electrostatic latent image of each color component having a required potential difference on the surface of the photosensitive drum.

Subsequently, each of the imaging devices 10 (Y, M, C, and K) supplies toner of the corresponding color (Y, M, C, or K) electrostatically charged to a required polarity (negative polarity) from the developing roller 141 to electrostatically adhere the toner to the electrostatic latent image of each color component formed on the photosensitive drum 11, thereby performing development. By this development, the electrostatic latent images of the respective color components formed on the respective photosensitive drums 11 are visualized as toner images of the four colors (Y, M, C, and K) developed with the toners of the corresponding colors.

Subsequently, when the toner images of the respective colors formed on the photosensitive drums 11 of the respective imaging devices 10 (Y, M, C, and K) are transported to the primary transfer position, the primary transfer devices 15 (Y, M, C, and K) primarily transfer the toner images of the respective colors in a state of being sequentially superimposed on the intermediate transfer belt 21 rotating in the direction indicated by the arrow B in the intermediate transfer device 20.

In addition, in each of the imaging devices 10 (Y, M, C, and K) in which the primary transfer has been completed, the drum cleaning device 16 removes adhered substances so as to scrape off the adhered substances to clean the surface of the photosensitive drum 11. As a result, each imaging device 10 (Y, M, C, or K) is brought into a state enabling the next imaging operation.

Subsequently, the intermediate transfer device 20 holds the toner image primarily transferred by the rotation of the intermediate transfer belt 21 and transports the toner image to the secondary transfer position. On the other hand, the sheet feeding device 50 sends out a required recording sheet 5 to the sheet feeding transport path 56 in accordance with the imaging operation. In the sheet feeding transport path 56, the pair of sheet transport rollers 55 as a resist roller sends out and supplies the recording sheet 5 to the secondary transfer position in accordance with the transfer timing.

At the secondary transfer position, the secondary transfer device 30 secondarily transfers the toner images on the intermediate transfer belt 21 collectively to the recording sheet 5. In addition, in the intermediate transfer device 20 in which the secondary transfer has been completed, the belt cleaning device 26 removes and cleans adhered substance such as toner remaining on a surface of the intermediate transfer belt 21 after the secondary transfer.

Subsequently, the recording sheet 5 onto which the toner image has been secondarily transferred is separated from the intermediate transfer belt 21 and then transported to the fixing device 40 via the sheet transport path 57. In the fixing device 40, the recording sheet 5 after the secondary transfer is introduced into the contact portion between the heating rotation body 41 and pressurizing rotation body 42 and caused to pass therethrough, so that necessary fixing processing (heating and pressurizing) is performed to fix the toner image yet to be fixed to the recording sheet 5. Lastly, the recording sheet 5 after the completion of the fixing is discharged by the sheet discharge roller pair 60 to, for example, the sheet discharge portion 58 installed in the upper part of the apparatus main body 1*a*.

By the foregoing operation, the recording sheet 5 on which a full-color image formed by combining toner images of the four colors is formed is output.

On the other hand, when the image forming apparatus 1 receives image information and command information of a request for black and while (monochrome) image forming operation (printing) from a personal computer, an image reading device, or the like (not shown), the control device 100 starts only the imaging device 10K for black (K) among the four imaging devices 10 (Y, M, C, and K), the intermediate transfer device 20, the secondary transfer device 30, the fixing device 40, and the like.

In the black and white mode, only the primary transfer device 15K for black (K) comes into contact with the surface of the photosensitive drum 11K for black (K) via the intermediate transfer belt 21, and the belt support roller 23 moves to a position where the primary transfer devices 15 (Y, M, and C) for color are separated from the surfaces of the photosensitive drums 11 (Y, M, and C) as well as from the intermediate transfer belt 21.

Then, a black (K) toner image is formed by the imaging device 10K for black (K), and a black and white (monochrome) image is formed on the recording sheet 5.

<Configuration of Characteristic Part of Image Forming Apparatus>

Figure 3:
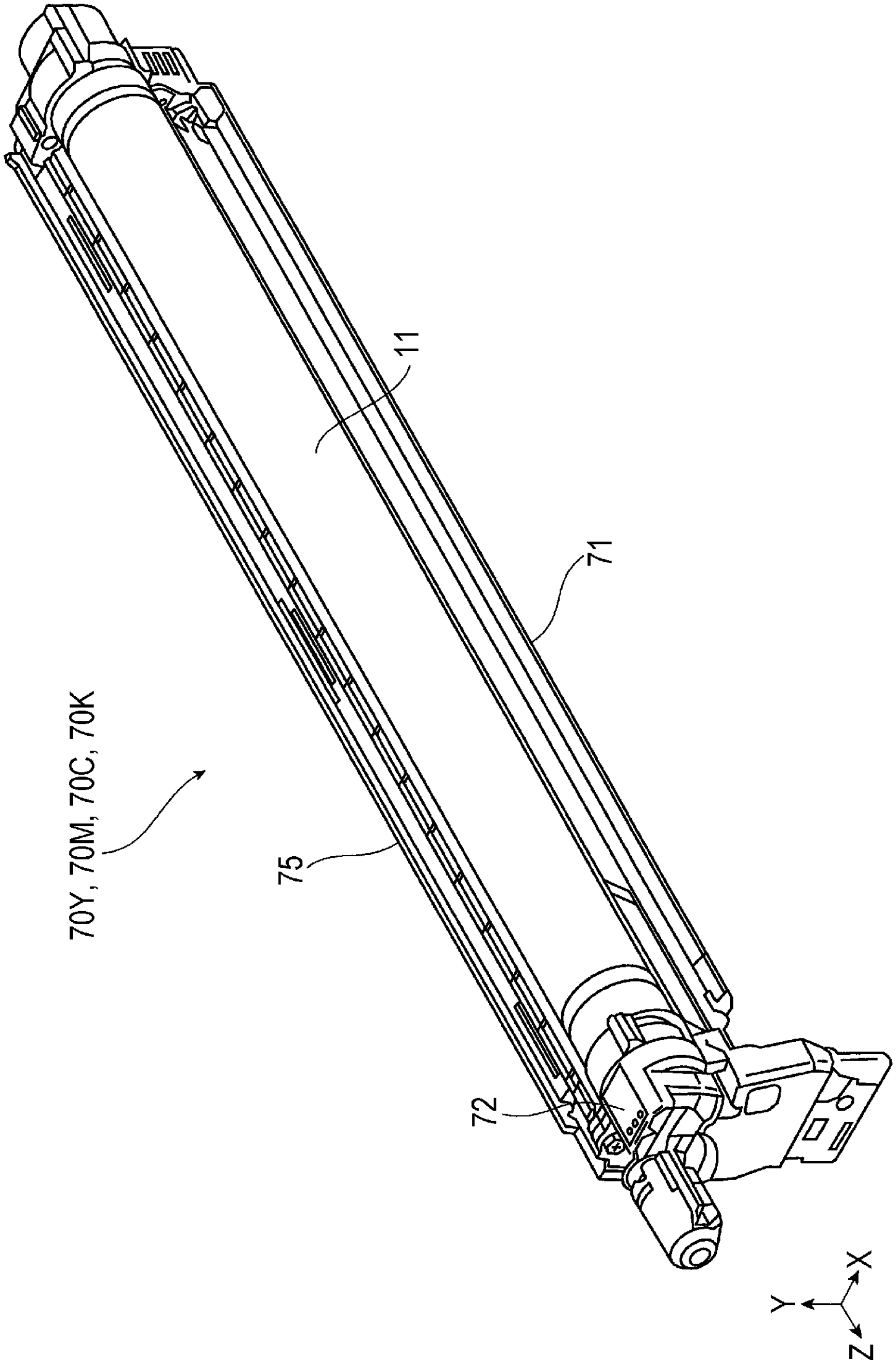
FIG. 3 is a perspective structural view illustrating a photosensitive unit.

As illustrated in FIGS. 2 and 3, in the image forming apparatus 1 according to the first embodiment, in the imaging device 10 for each color of yellow (Y), magenta (M), cyan (C), and black (K), the photosensitive drum 11, and the charging device 12 and the drum cleaning device 16 disposed around the photosensitive drum are integrally configured as a photosensitive unit 70 which is an example of a detachable unit. The photosensitive unit 70 is provided corresponding to the imaging device 10 for each color of yellow (Y), magenta (M), cyan (C), and black (K). Each of the photosensitive units 70 (Y, M, C, and K) is configured to be attachable to and detachable from the apparatus main body 1*a* of the image forming apparatus 1.

Each of the photosensitive units 70 (Y, M, C, and K) corresponding to the colors of yellow (Y), magenta (M), cyan (C), and black (K), respectively, includes the photosensitive drum 11, the charging device 12, the drum cleaning device 16, and a photosensitive unit main body 71 to which the photosensitive drum 11 is rotatably attached and to which the charging device 12 and the drum cleaning device 16 are attached. The photosensitive unit main body 71 has, at an upper end portion on a near side along an attachment and detachment direction thereof, a first grip portion 72 that is gripped by an operator such as a user and a service engineer when the photosensitive unit 70 is attached to or detached from the apparatus main body 1*a* of the image forming apparatus 1. In addition, the photosensitive unit main body 71 has, at a left end portion of the upper end thereof, a second grip portion 75 including a rail-shaped guidance portion that guides the photosensitive unit 70 along the attachment and detachment direction when the photosensitive unit 70 is attached to and detached from the apparatus main body 1*a*. The second grip portion 75 is linearly provided over substantially the entire length along a longitudinal direction (attachment and detachment direction) of the photosensitive unit main body 71.

Figure 4:
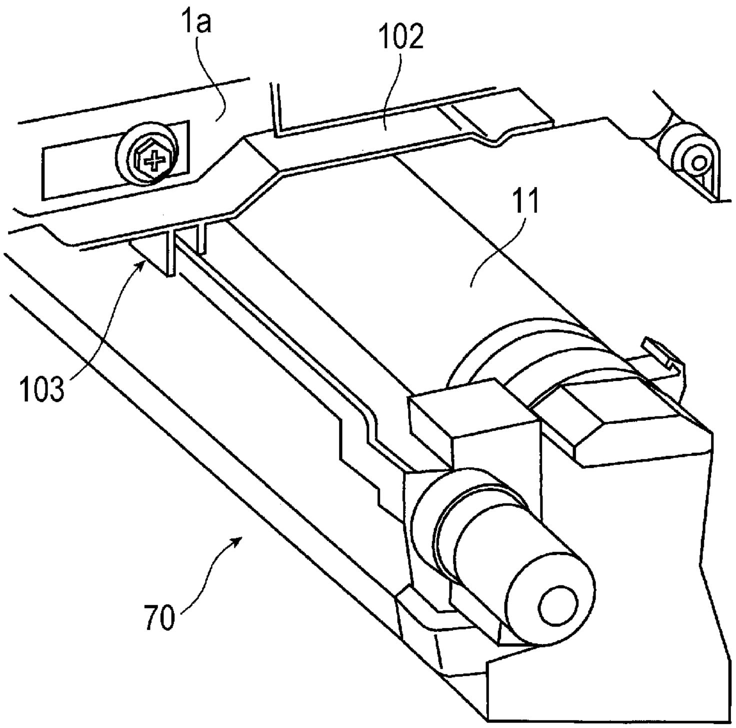
FIG. 4 is a perspective structural view illustrating a main part of an apparatus main body of the image forming apparatus.
Figure 5:
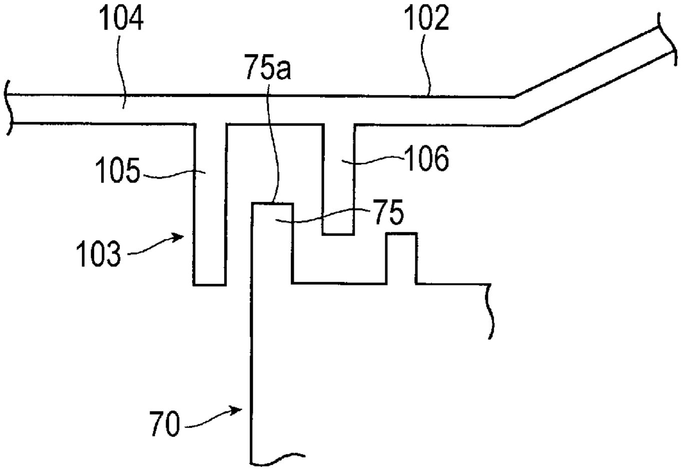
FIG. 5 is a front structural view illustrating the main part of the apparatus main body of the image forming apparatus.

As illustrated in FIG. 4, the photosensitive unit 70 (Y, M, C, or K) is attached to and detached from the apparatus main body 1*a* by being guided in a state in which the second grip portion 75 of the photosensitive unit main body 71 is sandwiched by a guide portion 103 provided at a lower end portion of a frame 102 of the intermediate transfer device 20 of the apparatus main body 1*a*. As shown in FIG. 5, the guide portion 103 of the apparatus main body 1*a* includes a horizontal plate portion 104 disposed along a horizontal direction, and first and second guide plate portions 105 and 106 provided in a state of being suspended downward along the vertical direction at a predetermined interval along the horizontal direction of the horizontal plate portion 104. The first guide plate portion 105 is formed to be longer downward along the vertical direction than the second guide plate portion 106.

The second grip portion 75 of the photosensitive unit 70 is attached to or detached from the apparatus main body 1*a* along the attachment and detachment direction in a state in which both side surfaces of the second grip portion in a thickness direction are guided by the first and second guide plate portions 105 and 106 of the apparatus main body 1*a*. As illustrated in FIG. 2, the second grip portion 75 of the photosensitive unit 70 is disposed in a state of being exposed to the internal space of the apparatus main body 1*a* of the image forming apparatus 1.

Figure 6:
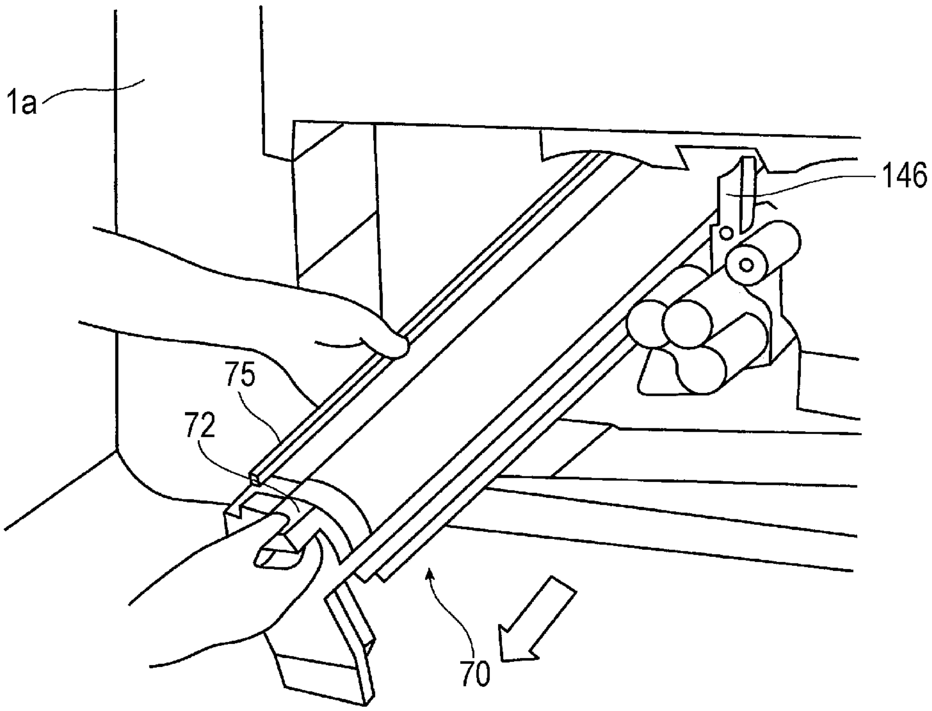
FIG. 6 is a schematic view illustrating a state in which the photosensitive unit is attached or detached.

As illustrated in FIG. 6, when the photosensitive unit 70 is detached from the apparatus main body 1*a* of the image forming apparatus 1, a stopper (not shown) provided in the photosensitive unit 70 is removed, and an operation lever 146 for separation provided in the adjacent developing device 14 is rotated in a clockwise direction in the drawing, so that the photosensitive unit is released from a state of being fixed to the apparatus main body 1*a* of the image forming apparatus 1, and is separated from the developing roller 141 of the adjacent developing device 14.

Then, when an operator such as a user and a service engineer grips the first grip portion 72, the photosensitive unit 70 is pulled out from the apparatus main body 1*a* toward the near side along the attachment and detachment direction. In addition, the photosensitive unit 70 is held and detached from the apparatus main body 1*a* by the operator by gripping, with the other hand, the second grip portion 75 provided on one side (the left side in the illustrated example) of an upper end portion of the photosensitive unit along the attachment and detachment direction.

Figure 7:
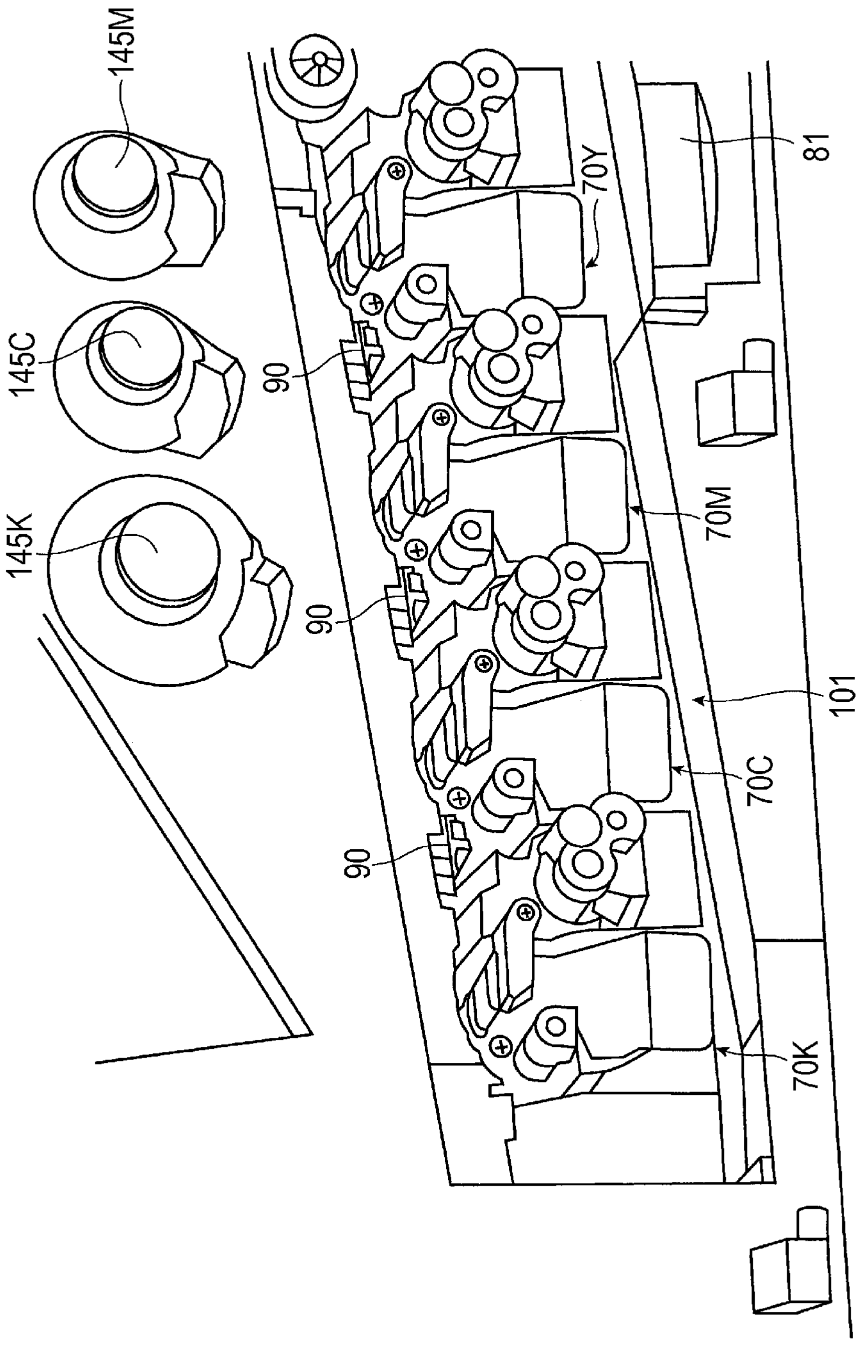
FIG. 7 is a perspective structural view illustrating a state in which a front cover of the image forming apparatus according to the first embodiment of the present invention is opened.

As illustrated in FIG. 7, the apparatus main body 1*a* of the image forming apparatus 1 has, on a front side thereof (the side on which the operator is positioned at the time of operation), an opening 101. The opening 101 of the apparatus main body 1*a* is opened by opening a front cover (not shown) so that the internal space of the apparatus main body 1*a* is exposed to the outside when the operator replaces the toner cartridge 145 (Y, M, C, or K) or replaces the photosensitive unit 70 (Y, M, C, or K).

Figure 8:
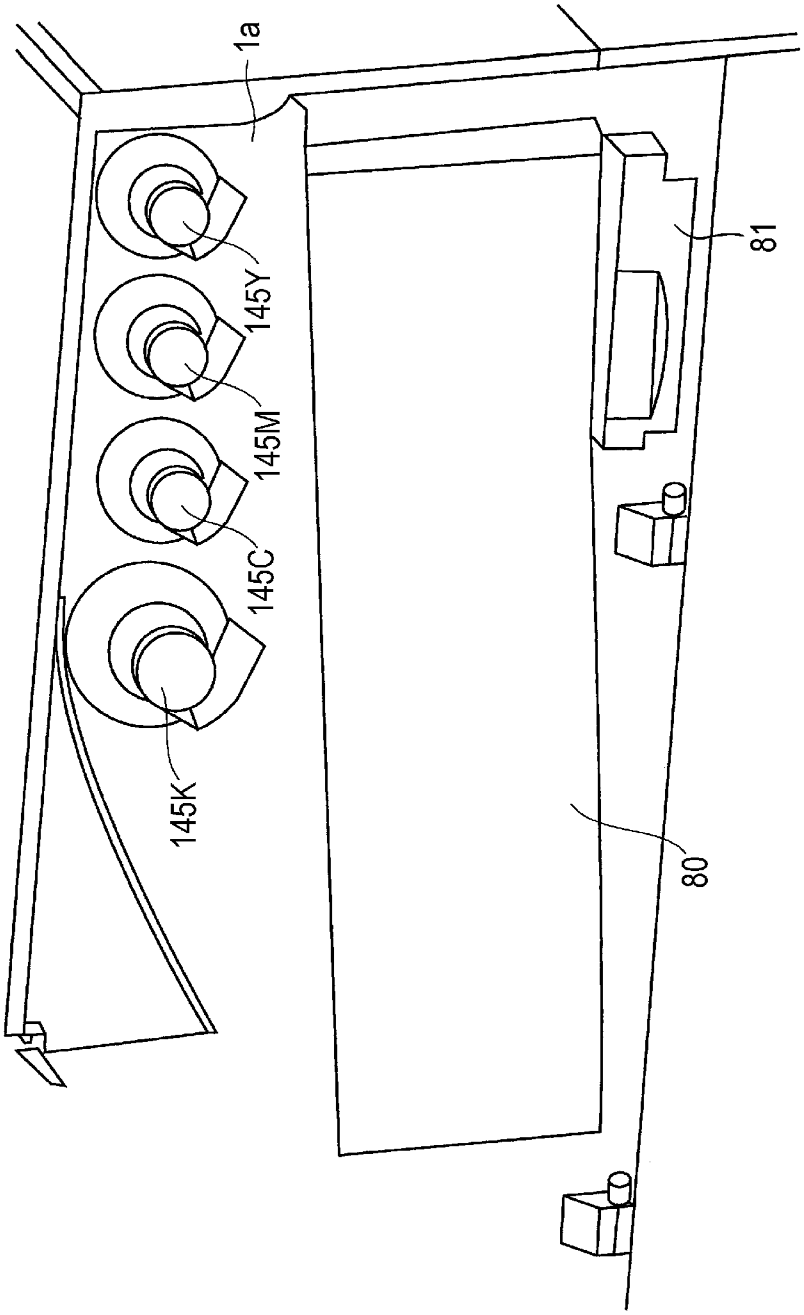
FIG. 8 is a perspective structural view illustrating a state in which the front cover of the image forming apparatus according to the first embodiment of the present invention is opened.

In the apparatus main body 1*a* of the image forming apparatus 1, as illustrated in FIG. 8, a collection unit 80, as an example of a preceding movement unit that moves to a retracted position with respect to the apparatus main body 1*a* prior to attachment and detachment of the photosensitive unit 70, is disposed on the nearer side than the photosensitive unit 70 in the opening 101. The collection unit 80 collects, into a collection container 81, a collected toner discharged from the photosensitive units 70 (Y, M, C, and K), a collected developer discharged from the developing devices 14 (Y, M, C, and K), or a collected toner, paper dust, and the like discharged from the belt cleaning device 26. In the apparatus main body 1*a* of the image forming apparatus 1, the collection unit 80 is detachably attached to the nearer side than the photosensitive unit 70 in the opening 101.

Meanwhile, as illustrated in FIGS. 1 and 2, in the internal space of the apparatus main body 1*a* of the image forming apparatus 1 configured as described above, during the image forming operation, a floating substance such as cloud toner floats around the photosensitive drum 11, in the opening of the developing device 14, or around the intermediate transfer belt 21. In particular, in the image forming apparatus 1, a large amount of floating substances such as cloud toner may float inside the apparatus main body 1*a* of the image forming apparatus 1, for example, when a high-density image such as a full-color solid image is continuously printed.

As illustrated in FIG. 2, a floating substance such as cloud toner floating in the apparatus main body 1*a* of the image forming apparatus 1 adheres to an upper end surface 75*a* of the second grip portion 75 of the photosensitive unit 70 and gradually accumulates. The second grip portion 75 of the photosensitive unit 70 is disposed close to the developing device 14K of the adjacent imaging device 10K, and when a high-density image such as a full-color solid image is developed, a large amount of cloud toner may be ejected from the opening of the device main body 140 of the developing device 14. The cloud toner emitted from the developing device 14 of the adjacent imaging device 10 on the left side is likely to adhere to and accumulate on the second grip portion 75 of the photosensitive unit 70 of the most closely adjacent imaging device 10 on the right side along a lower surface of the intermediate transfer belt 21.

Then, there occurs a technical problem that at the time of replacement of the photosensitive unit 70 or the like, as illustrated in FIG. 6, when the operator grips the second grip portion 75 of the photosensitive unit 70 with a finger in order to pull out the photosensitive unit 70 from the apparatus main body 1*a* of the image forming apparatus 1, a floating substance such as cloud toner adhered and accumulated on the upper end surface 75*a* of the second grip portion 75 of the photosensitive unit 70 adheres to the finger of the operator to soil the finger.

Therefore, the image forming apparatus according to the first embodiment is configured to include a cleaning unit that is provided in the apparatus main body and comes into contact with the grip portion of the detachable unit at the time of attachment or detachment of the detachable unit to clean floating substances adhered to the grip portion, the floating substances being in the apparatus main body.

Figure 9:
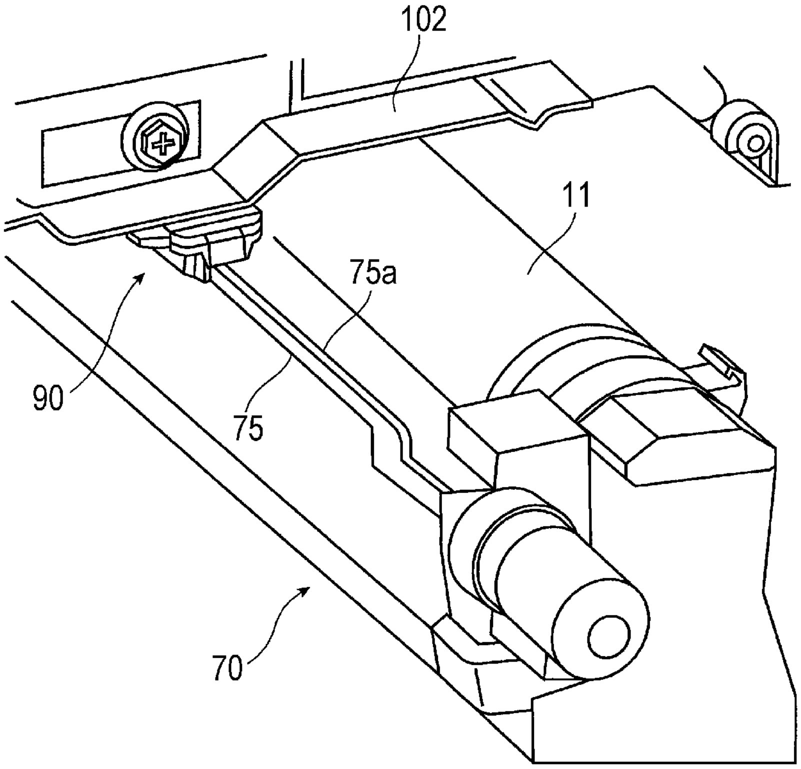
FIG. 9 is a perspective structural view illustrating a main part of the image forming apparatus according to the first embodiment of the present invention.

In other words, as illustrated in FIGS. 7 and 9, in the image forming apparatus 1 according to the first embodiment, at the lower end portion of the frame 102 of the intermediate transfer device 20 of the apparatus main body 1*a*, a cleaning member 90 as an example of a cleaning unit is provided at an end portion on the near side along the attachment and detachment direction of the guide portion 103 (see FIG. 4) that guides the second grip portion 75 of the photosensitive unit 70.

Figure 10A:
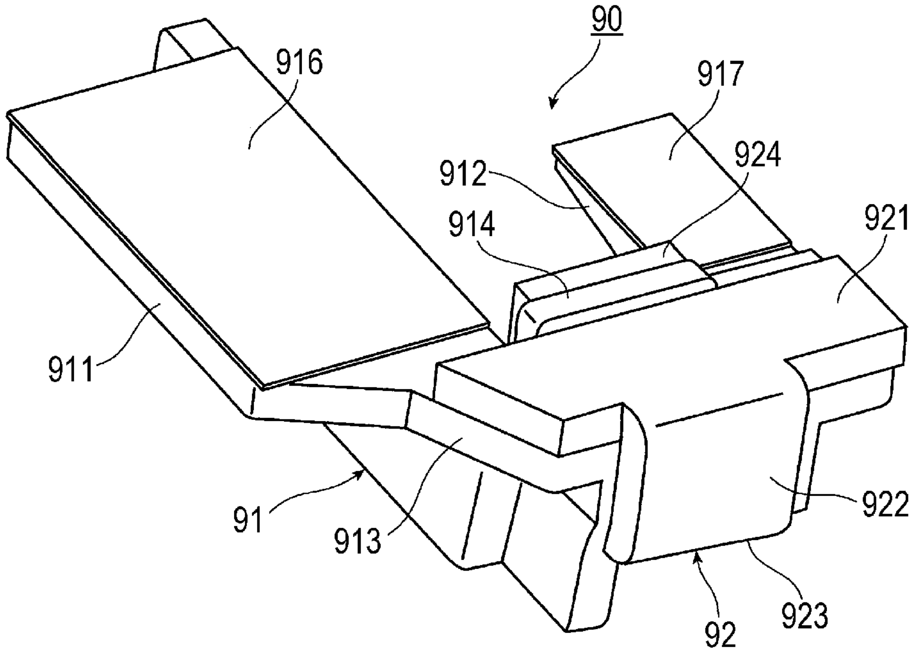
FIGS. 10A and 10B are perspective structural views illustrating a cleaning member.
Figure 10B:
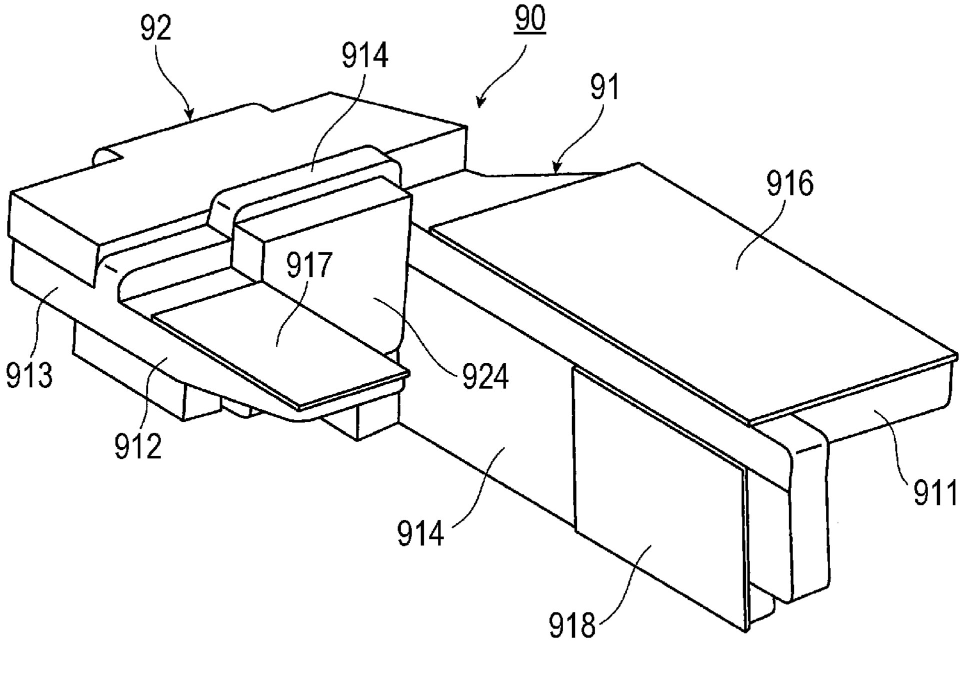
Figure 11:
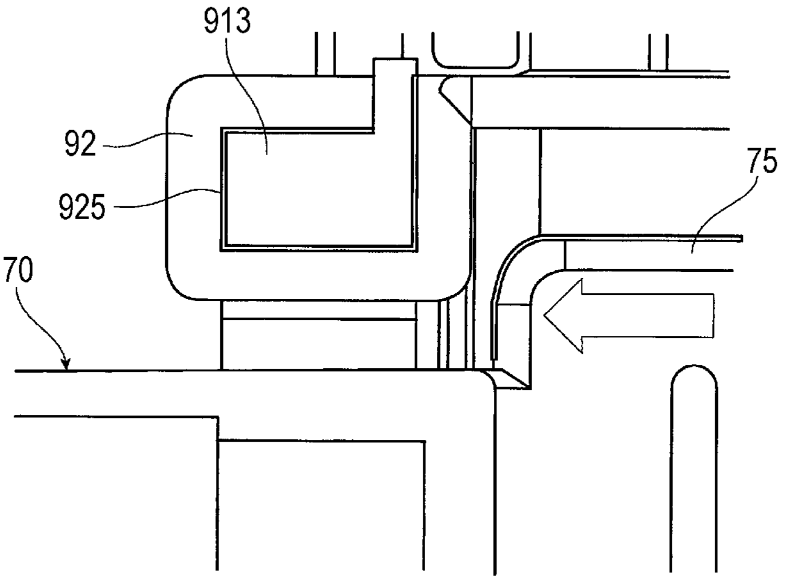
FIG. 11 is a cross-sectional structural view illustrating a state in which the cleaning member is attached.
Figure 12:
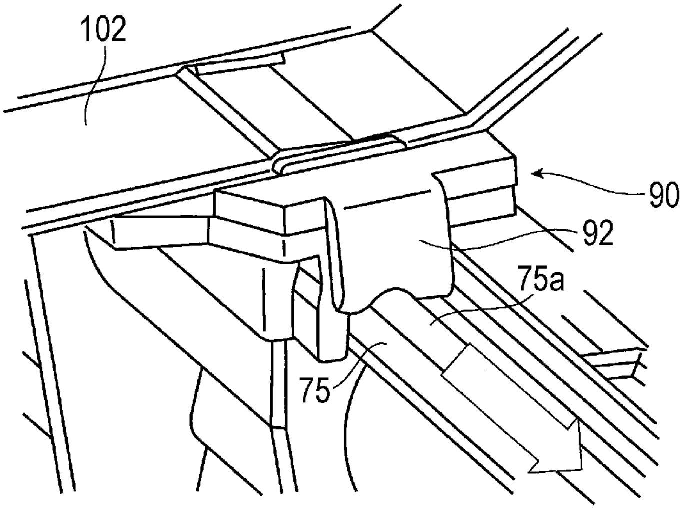
FIG. 12 is a perspective structural view illustrating the state in which the cleaning member is attached.

As illustrated in FIGS. 10A, 10B and 11, the cleaning member 90 includes a cleaning member main body 91 made of a synthetic resin or the like, and a felt member 92. The cleaning member main body 91 is a member to be attached to the apparatus main body 1*a* of the image forming apparatus 1 in a state of holding the felt member 92. As illustrated in FIGS. 11 and 12, the cleaning member main body 91 is formed in a shape corresponding to the guide portion 103 of the frame 102 of the intermediate transfer device 20, the guide portion being the attachment position of the apparatus main body 1*a*. The cleaning member main body 91 is attached in a state of being fixed to a lower surface of the guide portion 103 of the frame 102.

As illustrated in FIGS. 10A and 10B, the cleaning member main body 91 of the cleaning member 90 has first and second horizontal plate portions 911 and 912 disposed apart from each other along the horizontal direction on the lower surface of the guide portion 103 of the frame 102, a connecting plate portion 913 that connects the first and second horizontal plate portions 911 and 912 to each other at end portions on the near side along the attachment and detachment direction, a vertical plate portion 914 disposed so as to intersect downward with the first horizontal plate portion 911 from an inner side end portion thereof along the horizontal direction, and a positioning plate portion 914 disposed so as to protrude upward from the connecting plate portion 913 over an upper end surface of the second flat plate portion 912. The first horizontal plate portion 911 is formed to have a longer length along the attachment and detachment direction than the second horizontal plate portion 912.

As illustrated in FIGS. 10A and 10B, the cleaning member 90 is attached by adhesion to a lower end surface of the frame 102 and to an outer surface of the first guide plate portion 105 in the guide portion 103 of the frame 102 of the apparatus main body 1*a* via double-sided tapes 916, 917, and 918 adhered to the upper end surfaces of the first and second horizontal plate portions 911 and 912 and to an inner surface of the vertical plate portion 914.

As shown in FIGS. 10A and 10B, the felt member 92 is a member made of wool felt or the like cut into a required planar shape. The felt member 92 includes an upper end surface portion 921 formed in the same shape as a planar shape of the connecting plate portion 913 of the cleaning member main body 91, a front vertical portion 922 formed to have a width corresponding to a gap between the first horizontal plate portion 911 and the second horizontal plate portion 912, a lower end surface portion 923 formed in a shape corresponding to a lower end surface of the connecting plate portion 913 of the cleaning member body 91, and a rear vertical portion 924 formed in a shape corresponding to a rear surface of the connecting plate portion 913 of the cleaning member main body 91.

As illustrated in FIG. 11, the felt member 92 is provided in a state of being wound around an entire circumference, excluding the positioning plate portion 914, of an outer periphery of the connecting plate portion 913 of the cleaning member main body 91 by means of adhesion with a double-sided tape 925, bonding with an adhesive, and the like. The felt member 92 has required thickness and flexibility, and is formed in an R-shape with corners curved as a result of winding around the outer periphery of the connecting plate portion 913 of the cleaning member main body 91. As illustrated in FIG. 11, the positioning plate portion 914 of the cleaning member main body 91 is positioned by abutting on the end portion on the near side of the frame 102 of the apparatus main body 1*a* along the attachment and detachment direction of the guide portion 103 via the rear vertical portion 924 of the felt member 92.

Figure 13:
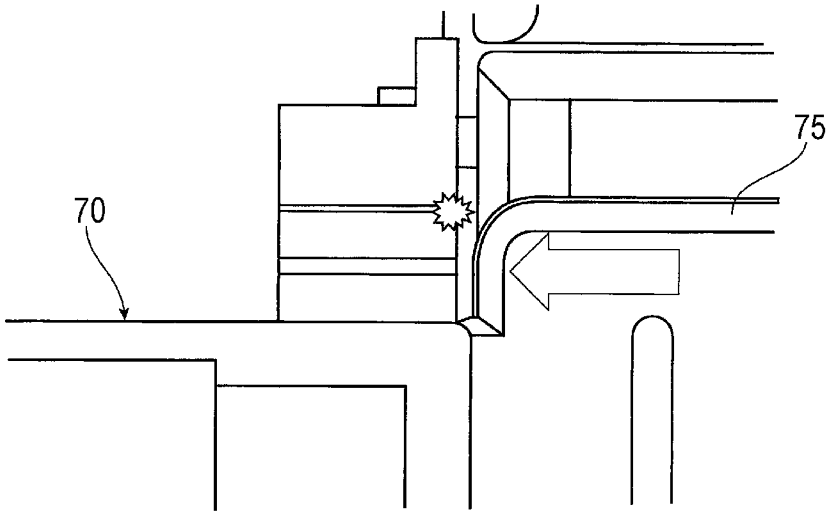
FIG. 13 is a cross-sectional structural view illustrating a state in which a cleaning member is attached as Comparative Example.

In addition, as illustrated in FIG. 11, by providing the felt member 92 to be wound around the entire outer periphery of the connecting plate portion 913 of the cleaning member body 91, it is possible to prevent or suppress damage or peeling off of the felt member due to rubbing with the second grip portion 75 of the photosensitive unit 70 when the photosensitive unit 70 is attached or detached, as compared with a case where the felt member 92 is attached only to the lower end surface of the connecting plate portion 913 of the cleaning member main body 91 as illustrated in FIG. 13.

<Action of Characteristic Part of Image Forming Apparatus>

The image forming apparatus 1 according to the first embodiment, in the following manner, suppresses soiling of an operator's hand due to a floating substance such as cloud toner adhering to the grip portion of the detachable unit as compared with a case where the cleaning unit that comes into contact with the grip portion of the detachable unit to clean the grip portion when the detachable unit is attached or detached.

Specifically, in the image forming apparatus 1 according to the first embodiment, as illustrated in FIG. 1, during the image forming operation, in the imaging devices 10 (Y, M, C, and K) for yellow (Y), magenta (M), cyan (C), and black (K), respectively, image exposure according to image information is performed on the respective photosensitive drums 11 by the respective exposure devices 13 to form an electrostatic latent image, and the electrostatic latent image formed on each photosensitive drum 11 is developed by the developing roller 141 of the developing device 14 (Y, M, C, or K) to form a toner image.

Meanwhile, in the internal space of the apparatus main body 1*a* of the image forming apparatus 1 configured as described above, during the image forming operation, a floating substance such as cloud toner floats around the photosensitive drum 11, in the opening of the developing device 14, around the intermediate transfer belt 21, or other place. In particular, in the image forming apparatus 1, a large amount of floating substances such as cloud toner may float inside the apparatus main body 1*a* of the image forming apparatus 1, for example, when a high-density image such as a full-color solid image is continuously printed. As in a conventional example (Comparative Example) illustrated in FIG. 13, a floating substance such as cloud toner floating in the apparatus main body 1*a* of the image forming apparatus 1 adheres to the upper end surface 75*a* of the second grip portion 75 of the photosensitive unit 70 and gradually accumulates.

Then, in the conventional image forming apparatus 1, at the time of replacement of the photosensitive unit 70 or the like, as illustrated in FIG. 6, when the operator grips the second grip portion 75 of the photosensitive unit 70 with a finger in order to take out the photosensitive unit 70 from the apparatus main body 1*a* of the image forming apparatus 1, a floating substance such as cloud toner adhered to and accumulated on the upper end surface 75*a* of the second grip portion 75 of the photosensitive unit 70 adheres to the finger of the operator to soil the finger.

By contrast, in the case of the image forming apparatus 1 according to the first embodiment, as illustrated in FIG. 12, there is provided the cleaning member 90 including the felt member 92 that comes into pressure contact with the upper end surface 75*a* of the second grip portion 75 of each photosensitive unit 70 to clean the grip portion at the time of detaching the photosensitive unit 70 from the apparatus main body 1*a*. Moreover, as illustrated in FIGS. 11 and 12, the cleaning member 90 is configured not only to simply come into contact with the upper end surface 75*a* of the second grip portion 75 of each photosensitive unit 70, but also to clean the upper end surface 75*a* of the second grip portion 75 of each photosensitive unit 70 in a manner that the felt member 92 of the cleaning member 90 is elastically deformed to rub the upper end surface of the second grip portion with a required pressure contact force.

Therefore, when the upper end surface 75*a* of the second grip portion 75 of each photosensitive unit 70 is detached from the apparatus main body 1*a* of the image forming apparatus 1, the felt member 92 of the cleaning member 90 cleans the upper end surface of the second grip portion by rubbing with a required pressure contact force, so that the floating substance such as cloud toner or the like adhered to and accumulated on the upper end surface can be reliably removed. As a result, adhesion of an adhered substance, such as cloud toner, floating in the apparatus main body 1*a* of the image forming apparatus 1, to the upper end surface 75*a* of the second grip portion 75 of each photosensitive unit 70 is suppressed or prevented, thereby suppressing or preventing a finger of an operator who conducts replacement work for the photosensitive unit 70 or the like from being soiled.

Although the above embodiment has been described with respect to the case where the cleaning member 90 is provided as a separate member at the guide portion 103 of the frame 102 of the apparatus main body 1*a*, a main body of the cleaning member 90 may be provided integrally with the frame 102 of the apparatus main body 1*a* and the felt member may be provided on the main body.

What is claimed is:

1. An image forming apparatus comprising:

a detachable unit that is attachable to and detachable from an apparatus main body; and a cleaning unit that is provided in the apparatus main body, and at the time of attachment or detachment of the detachable unit, comes into contact with a grip portion of the detachable unit to clean a floating substance adhered to the grip portion, the floating substance being in the apparatus main body.

2. The image forming apparatus according to claim 1, wherein the grip portion of the detachable unit includes a guidance portion having a rail shape that guides the detachable unit in an attachment and detachment direction at the time of attachment or detachment of the detachable unit to or from the apparatus main body.

3. The image forming apparatus according to claim 2, wherein the cleaning unit is provided in a guide portion that is provided in the apparatus main body and guides the guidance portion of the detachable unit.

4. The image forming apparatus according to claim 1, wherein the cleaning unit includes a felt member that comes into pressure contact with the grip portion of the detachable unit.

5. The image forming apparatus according to claim 4, wherein the cleaning unit is provided in a state of being wound around an outer periphery of a support member disposed in a direction intersecting the attachment and detachment direction of the detachable unit.

* * * * *